(12) United States Patent
Wozniak et al.

(10) Patent No.: US 11,010,096 B2
(45) Date of Patent: May 18, 2021

(54) PROBABILISTICALLY SELECTING STORAGE UNITS BASED ON LATENCY OR THROUGHPUT IN A DISPERSED STORAGE NETWORK

(71) Applicant: International Business Machines Corporation, Armonk, NY (US)

(72) Inventors: Ethan S. Wozniak, Park Ridge, IL (US); Ravi V. Khadiwala, Bartlett, IL (US); John R. Carrell, Geneva, IL (US); Bohdan L. Bodnar, Park Ridge, IL (US); Alex Marchenko, Brookfield, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/571,525

(22) Filed: Sep. 16, 2019

(65) Prior Publication Data
US 2020/0326885 A1   Oct. 15, 2020

Related U.S. Application Data

(63) Continuation of application No. 16/384,102, filed on Apr. 15, 2019.

(51) Int. Cl.
*G06F 3/06* (2006.01)
*G06F 11/10* (2006.01)

(52) U.S. Cl.
CPC ............ *G06F 3/0659* (2013.01); *G06F 3/067* (2013.01); *G06F 3/0611* (2013.01); *G06F 3/0653* (2013.01); *G06F 11/1076* (2013.01)

(58) Field of Classification Search
CPC .... G06F 3/0659; G06F 3/0611; G06F 3/0653; G06F 3/067; G06F 11/1076
See application file for complete search history.

(56) References Cited

U.S. PATENT DOCUMENTS 7,401,198 B2   7/2008   Johnston et al.
7,761,592 B2   7/2010   Buriano et al.
(Continued)

FOREIGN PATENT DOCUMENTS

WO   2017020742 A1   2/2017

OTHER PUBLICATIONS

Yang et al.; Latency-Sensitive Data Allocation and Workload Consolidation for Cloud Storage; IEEE Access; Nov. 2018; pp. 76098-76110; vol. 6 [downloaded from https://www.researchgate.net/publication/329227047_Latency-Sensitive_Data_Allocation_and_Workload_Consolidation_for_Cloud_Storage].

(Continued)

*Primary Examiner* — Kyle Vallecillo
(74) *Attorney, Agent, or Firm* — James Nock; Andrew D. Wright; Roberts Calderon Safran & Cole, P.C.

(57) ABSTRACT

A method for execution by a dispersed storage and task (DST) processing unit includes receiving an access request via a network. A set of possible storage units for performance of the access request are determined. A latency summarization value is determined for each of the set of possible storage units based on historical latency data for the set of possible storage units. A weight for each of the set of possible storage units is determined based on the latency summarization values to generate a plurality of weights. A probabilistic selection function is performed in accordance with the plurality of weights to select a proper subset of the set of possible storage units. A plurality of requests are generated based on the access request for transmission, via the network, to the proper subset of the set of possible storage units.

20 Claims, 9 Drawing Sheets

(56) References Cited

U.S. PATENT DOCUMENTS

| | | | |
|---|---|---|---|
| 9,128,825 B1 | 9/2015 | Albrecht et al. | |
| 9,697,034 B2 | 7/2017 | Chadha et al. | |
| 10,411,983 B2 | 9/2019 | Mizrahi et al. | |
| 2011/0184997 A1* | 7/2011 | Grube | G06F 16/182 707/827 |
| 2013/0204960 A1 | 8/2013 | Ashok et al. | |
| 2014/0244879 A1* | 8/2014 | Myrah | G06F 13/409 710/300 |
| 2017/0212705 A1 | 7/2017 | Kidney et al. | |
| 2017/0230295 A1* | 8/2017 | Polacek | H04L 65/80 |
| 2017/0339041 A1* | 11/2017 | Mizrahi | H04L 43/022 |
| 2018/0165015 A1* | 6/2018 | Malina | H03M 13/154 |
| 2018/0165016 A1* | 6/2018 | Malina | G06F 3/0611 |
| 2018/0300065 A1* | 10/2018 | Talwar | G06F 3/067 |
| 2020/0021536 A1 | 1/2020 | Kanza et al. | |

OTHER PUBLICATIONS

Office Action dated Jun. 5, 2020 in related U.S. Appl. No. 16/384,102, 8 pages.
List of IBM Patents or Patent Applications Treated as Related, dated Aug. 19, 2020, 1 page.
Specification "Probabilistically Selecting Storage Units Based on Latency or Throughput in a Dispersed Storage Network" and drawings in related U.S. Appl. No. 16/384,102, filed Apr. 15, 2019, 55 pages.
Final Office Action dated Sep. 11, 2020 in related U.S. Appl. No. 16/384,102, 7 pages.
Notice of Allowance dated Nov. 25, 2020 in related U.S. Appl. No. 16/384,102, 6 pages.

* cited by examiner

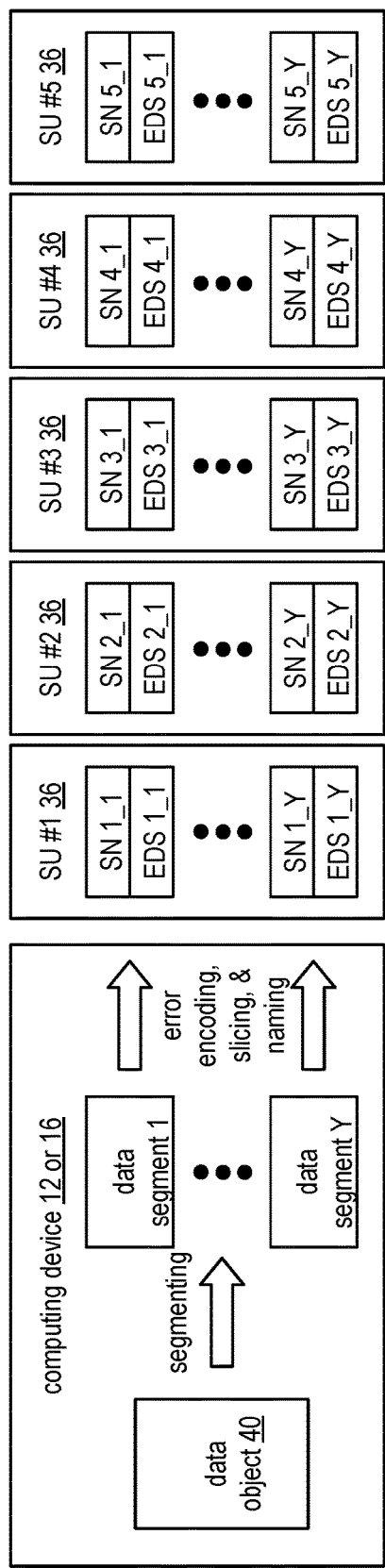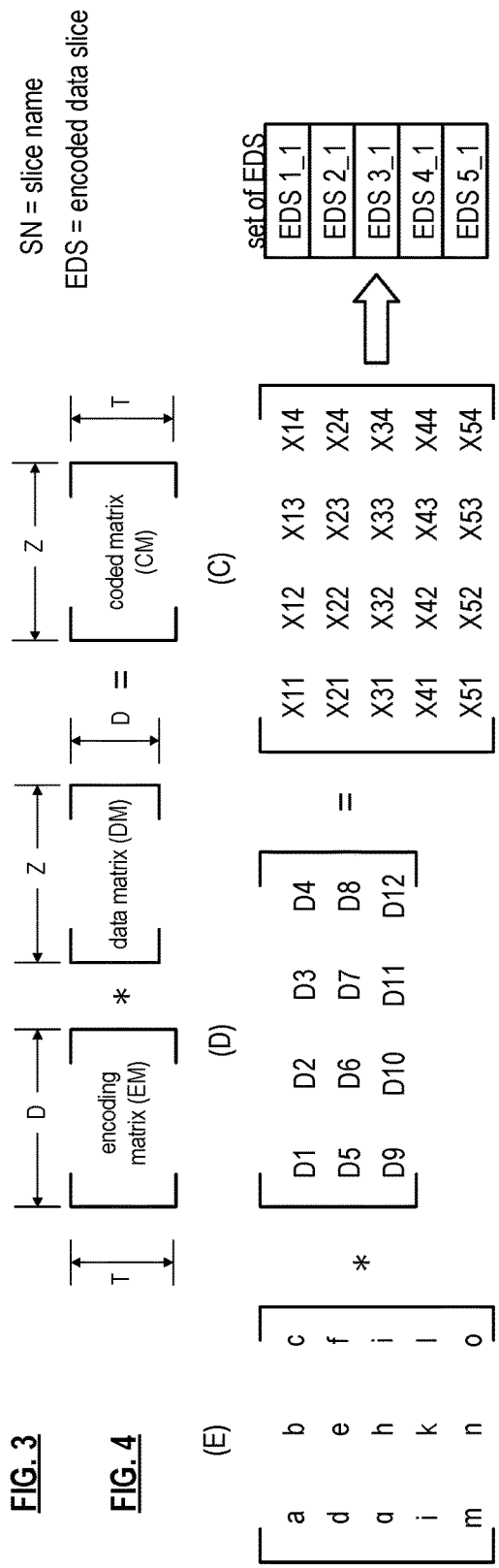
FIG. 3
FIG. 4
FIG. 5
FIG. 6

PROBABILISTICALLY SELECTING STORAGE UNITS BASED ON LATENCY OR THROUGHPUT IN A DISPERSED STORAGE NETWORK

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
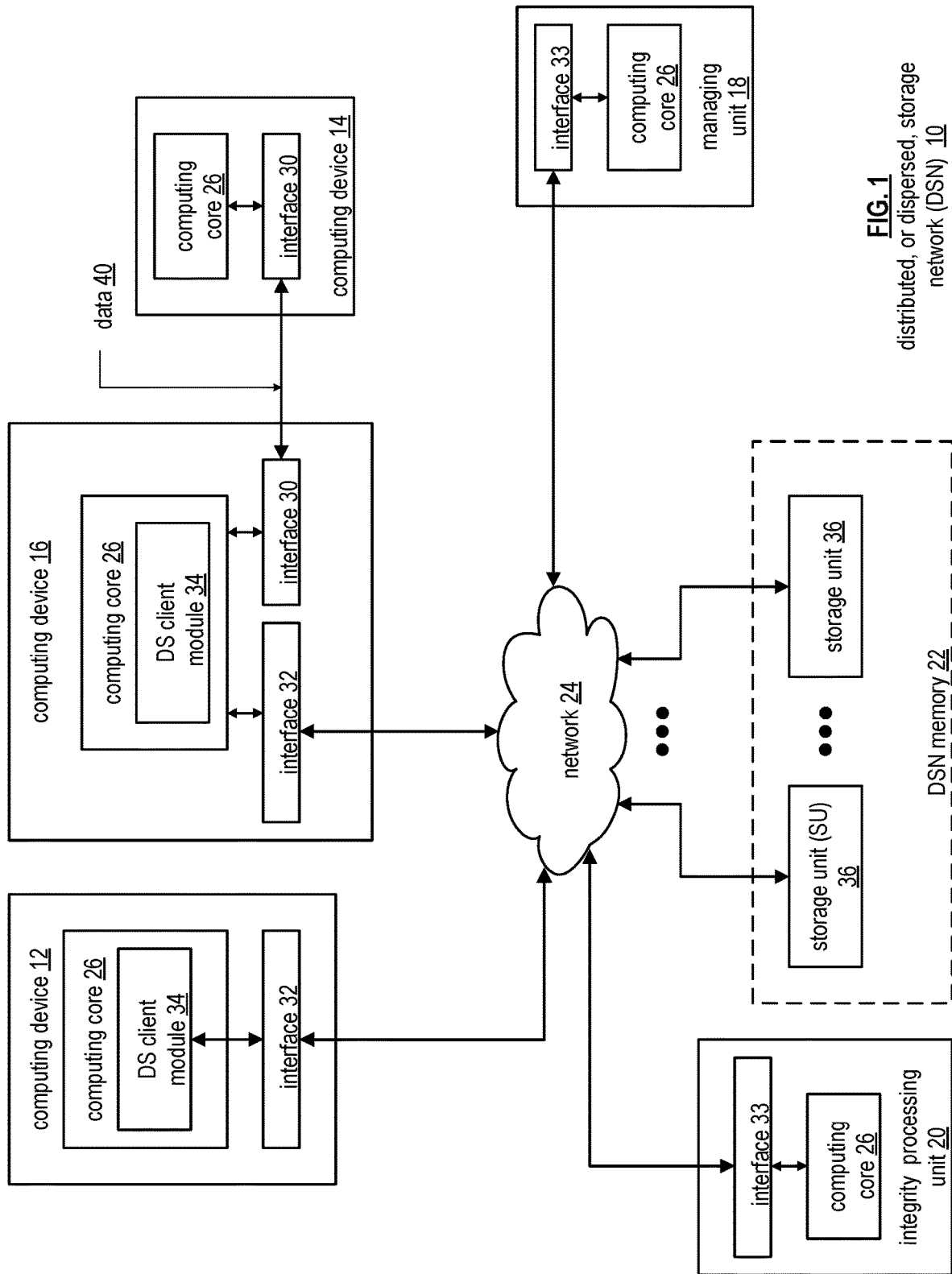
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; one or more satellite communication systems; one or more fiber optic communication systems; and/or one or more local area networks (LAN) and/or wide area networks (WAN).

Figure 2:
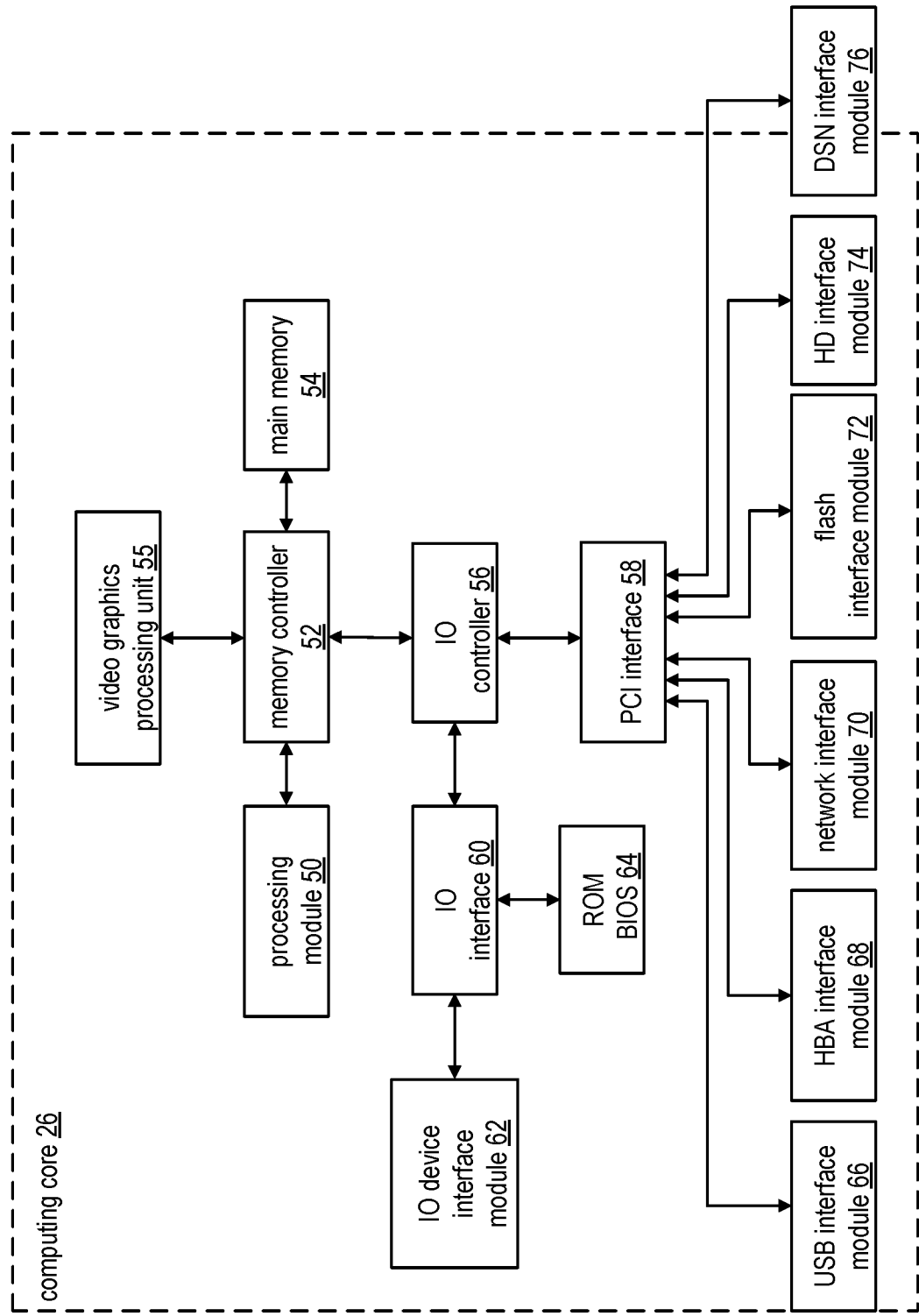
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (10) controller 56, a peripheral component interconnect (PCI) interface 58, an 10 interface module 60, at least one 10 device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as 10 ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can be a file and/or otherwise include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
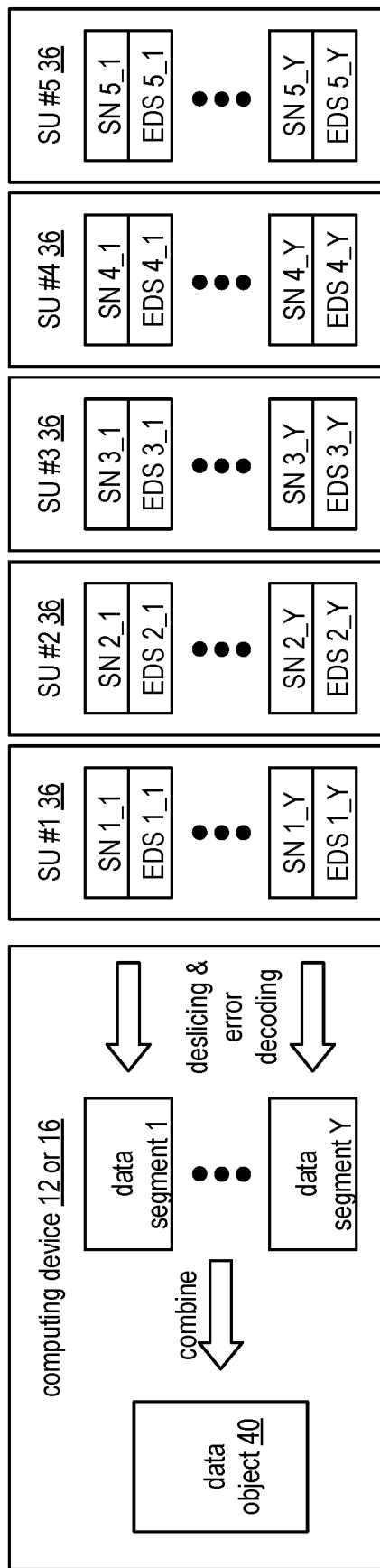
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
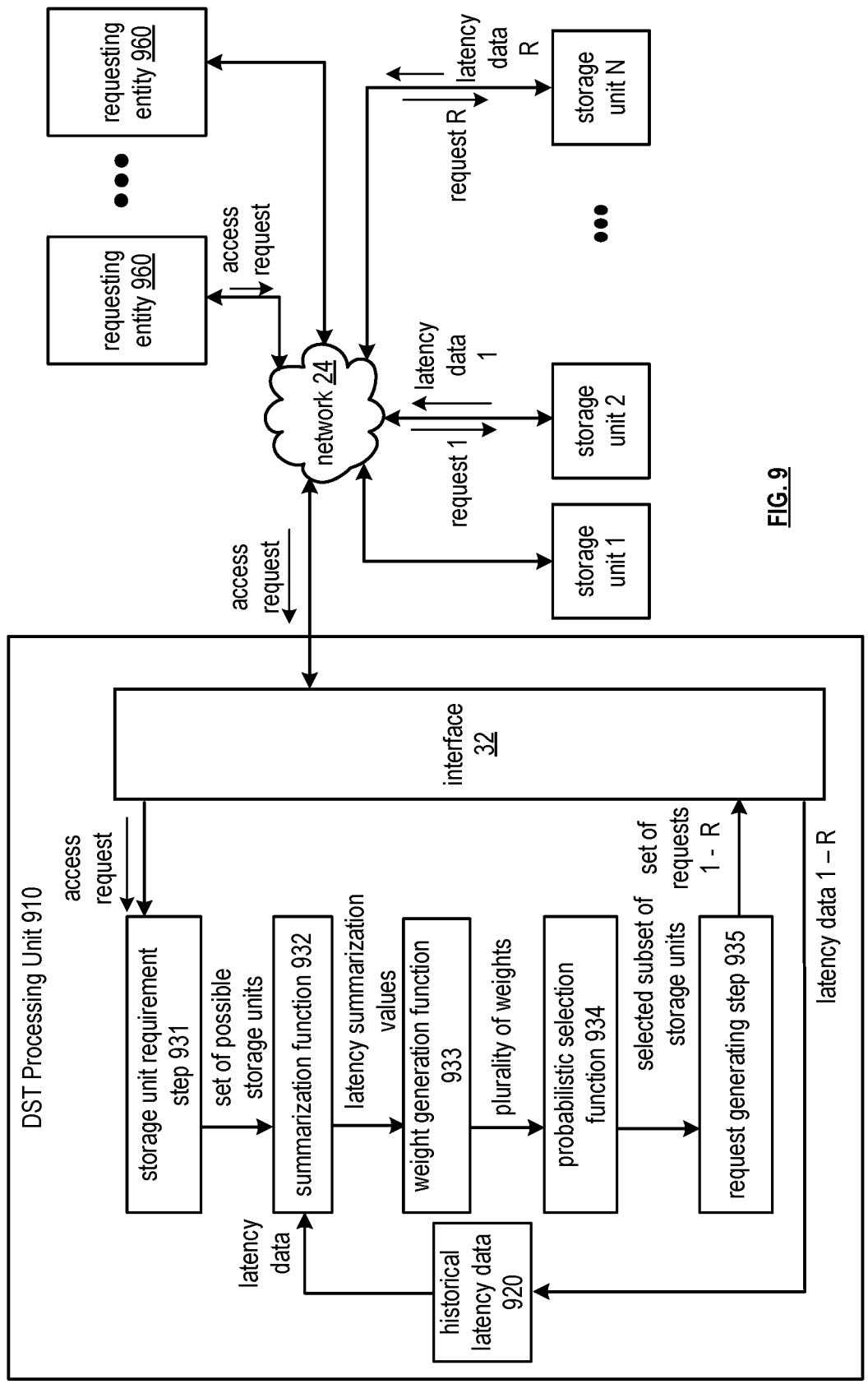
FIG. 9 is a schematic block diagram of an embodiment of a dispersed or distributed storage network (DSN) in accordance with the present invention.

FIG. 9 is a schematic block diagram of another embodiment of a dispersed storage network (DSN) that includes a DST processing unit 910, at least one requesting entity 960, and a plurality of storage units 1-N, communicating via network 24 of FIG. 1. The DST processing unit 910 can include the interface 32 of FIG. 1, the computing core 26 of FIG. 1, and/or the DS client module 34 of FIG. 1, and can be implemented by utilizing the computing device 16 of FIG. 1, for example, functioning as a dispersed storage processing agent for computing device 14 as described previously. Each storage unit may be implemented utilizing the storage unit 36 of FIG. 1, and can include its own at least one processor and memory operable to store encoded data slices or other data. The at least one requesting entity 960 can be implanted utilizing the user device 14 of FIG. 1 and/or another computing device such as another computing device 16 of FIG. 1. The DSN functions to probabilistically select storage units for latency and throughput.

The DST processing unit 910 can be operable to send access requests to the storage units via network 24. The access requests can include data slices to be written to storage, read requests, and/or task requests. The DST processing unit 910 can receive data slices stored by the storage units in response. One or more DST processing unit 910 can generate the data slices for storage by performing a dispersed storage error encoding function on a set of data segments for storage, where the encoded data slices of a data segment are transmitted to an information dispersal algorithm (IDA) width threshold number of storage units. One or more DST processing unit 910 can recover a data segment by retrieving at least an IDA decode threshold number of encoded data slices from at least a corresponding IDA decode threshold number of storage units, and by performing a dispersed storage error decoding function on the received encoded data slices.

When one or more data segments of a data object are requested to be written, read, or otherwise accessed, the DST processing unit can select a subset of a plurality of storage units in the DSN to perform this access. For example, an IDA width threshold number of storage units required to store a set of encoded slices produced for a write request for a data segment can be selected from a plurality of possible storage units. As another example, the IDA decode threshold number of encoded data slices from which to retrieve a set of encoded slices in response to a request to read the data segment can be selected from the IDA width threshold number of storage units storing the encoded slices and/or from multiple sets of IDA width threshold number of storage units storing multiple sets, such as duplicate sets, of encoded slices for the requested data segment.

When determining which subset of storage units will be selected for transmission of a set of requests to write, read, or otherwise access data, the DST processing unit can probabilistically select the subset of storage units from a pool of possible storage units. In some embodiments, the pool of possible storage units includes all of the plurality of storage units communicating with the DST processing unit. In some embodiments, the pool of possible storage unit is a proper subset of the all of the plurality of storage units communicating with the DST processing unit, determined based on criteria such as storage units with capacity to store new data, storage units in the same vault or a set of vaults determined to store the data, and/or storage units currently storing encoded slices of the data requested for access.

This probabilistic selection of the subset of storage units can be based on latencies of prior requests of the pool of possible storage units. Alternatively or in addition, this probabilistic selection of the subset of storage units can be based on throughput of prior requests of the pool of possible storage units. For example, when selecting storage units to send requests to from a pool of possible storage units, DST processing units can probabilistically select storage units based on the latencies of recent prior requests to those storage units and/or the throughputs of recent prior requests to those storage units, to find a balance between low latency and better throughput via load spreading. The calculated probabilities can be calculated based on configurable formulas involving sliding windows of recent latencies and/or recent throughputs, or can use all latency data and/or throughput data collected over time. The configurable formulas can be tuned by operators to favor low latency or high throughput depending on their needs. This tuning can be performed automatically by the DST processing unit and/or can be determined based on user input to an interactive user interface, for example, displayed on a display device communicating with the DST processing unit directly or via network 24.

In some cases, to complete an operation, DST processing units must send requests to and receive responses from a threshold number of storage units, for example, in accordance with an IDA width and/or IDA decode threshold as discussed above. In cases where the DST processing unit can choose a subset of storage units from a larger set of storage units in order to complete an operation, such as needing a threshold number of slice reads from a width of storage units for reconstructing an object with dispersed storage error coding function, the DST processing unit can lower the latency of the operation by choosing storage units that have had relatively lower latency for recent prior requests. Rather than always choosing the storage units with the lowest latest latency from the set of possible storage units, DST processing units can use a selection weighting function that assigns a probability of selecting each storage unit based on their latency, such that storage units with lower latency have a higher probability of selection than storage units with higher latency. The DST processing units can further consider the recent throughput measurements of the storage units, and can assign a probability of selecting each storage unit based on their recent latency and/or recent throughput, such that, given equal latency, storage units with lower recent throughputs have a lower probability of selection than storage units with higher recent throughputs.

This process of probabilistic selection of a subset of a set of possible storage units can help to avoid cases where all requests go to the storage units with the lowest latency, leaving the other storage units underutilized, even if they had only marginally higher latency or if their higher latency was temporary, for example, due to traffic fluctuations. This process of probabilistic selection of a subset of a set of possible storage units can also smooth out and/or avoid cases where the storage units with the lowest latency switch rapidly. In particular, without the smoothing via probabilistic selection, having low latency can cause storage units to receive a large number of requests, which thus causes high latency due to high load, causing these storage to stop receiving requests to again cause low latency due to low load, and the cycle can thus repeat. Probabilistic selection of storage units helps smooth this repeating, rapid switching of latency, and/or can smooth and/or reduce the amount and/or frequency by which storage units change in latency.

The DST processing unit can determine most recent latencies and/or track latencies of some or all of the plurality of possible storage units over time, for example, where tracked latency data and/or tracked throughput data for a storage unit is determined for every access, or sets of accesses, to the storage unit by the DST processing unit and/or by other entities of the DSN. Alternatively, only a threshold proportion of accesses, selected in accordance with pre-determined time intervals, an even distribution, and/or a random selection, can be tracked for storage units. A latency value for an access can be determined by the DST processing unit based on a time interval measured from the time that an access request was sent to the storage unit via the network until the time success of the access is confirmed, based on a response received from the storage unit via the network. In some embodiments, the response received from the storage unit can include internal latency and/or throughput measurements, current CPU and/or memory load conditions, changes in health measurements of components of the storage unit, or other relevant metrics computed and/or measured by the storage units themselves in conjunction with executing the received access request, and this information can be utilized to determine the latency value. In some embodiments, the storage units can transmit this computed and/or measured latency and/or throughput information to the DST processing unit periodically in predetermined intervals and/or in response to a request for this information sent by the DST processing unit, even if an access is not performed. In some embodiments, the DST processing unit can perform latency tests on some or all of the storage units, such as on selected storage units indicating recent, unexpected changes in latency and/or selected storage units that have not been accessed recently and/or with an access frequency that compares favorably to a low access threshold. The latency tests can include sending a request or ping to the storage unit, which can require the storage unit to perform a test operation, and receiving a response from the storage units, where the time interval and/or other information received in response from the test is utilized to determine the latency value. A throughput value for the storage unit can be determined by the DST processing unit based on a number of requests processed by the storage unit within a timeframe. In some embodiments, the throughput value for the storage unit is determined to be a function of the latency value, such as an inverse of the latency value, and may not be measured and/or stored separately.

Once this raw time interval and/or other relevant information measured by the storage units is determined, the latency value and/or throughput value can be generated directly to be set as one or more corresponding raw values. For example, the latency value can be equal to the raw time interval and/or the throughput value can be equal to the number of accesses per timeframe or amount of data processed per timeframe. Alternatively, the latency value and/or throughput measurement can be generated by normalizing one or more corresponding raw values based on other factors. For example, the latency value can be generated based on a comparison of this raw information to the current average latency across all storage units, where the latency values indicate latency with respect to current average latency across all storage units. In some embodiments, the latency value is normalized and/or adjusted based on the type of access, where the latency value for a more lengthy and/or expensive accesses is adjusted based on the fact that the access request itself required additional time and/or resources. In some embodiments, determining the latency value includes quantizing the raw information into one of a discrete set of latency categories, such as a low latency category, a normal latency category, a high latency category, and/or any discrete number of latency categories separated by increasing latency. In some embodiments, generating the latency value includes applying a transform function, such as a squaring function or other function that, for example, causes high latencies to spread further from each other in value while causing low latencies will be spread less and/or to be brought closer together. Throughput values can be averaged, normalized, quantized, transformed, or otherwise determined and/or adjusted in the same or different fashion as discussed with regards to the latency value, with respect to raw or processed throughput values.

As used herein, an average latency can correspond to an average latency computed over the entire range of current latency values, historical latency value, and/or all latency values that compare favorably to a recency threshold. Alternatively, an average latency or other computed averages discussed herein can correspond to a mean within a particular percentile of the distribution of values utilized to compute the average, and/or can correspond to a mean within a particular range of the distribution of the values. For example, the average latency can be computed by calculating the mean latency of a selected n-th percentile of the distribution of latencies, such as the $90^{th}$ percentile of current latency values, historical latency value, and/or all latency values that compare favorably to a recency threshold. The average latency can also be determined by computing a different value characterizing the selected n-th percentile of the distribution. In some embodiments, this mechanism is utilized when the latency values are determined to be in accordance with a lognormal distribution and/or a skewed distribution. The n-th percentile utilized to determine the average latency can be determined automatically based on determined properties of the corresponding distribution. The selected n-th percentile can alternatively be determined based on user configurations and/or a user selection made to a client device in response to a prompt presented via a graphical user interface displayed by a display device of the client device. Average throughput can similarly correspond to a mean of a particular percentile of a distribution of throughput values.

The DST processing unit can store this raw and/or processed latency data generated over time, mapped to their respective storage unit, as historical latency data 920. The historical latency data 920 can alternatively or additionally include raw and/or processed throughput data generated over time, mapped to their respective storage unit. The historical latency data 920 can be stored locally and/or can be stored in the DSN for access by one or more DST processing units via network 24. The historical latency data can include latency values, throughput values and/or other latency data and/or other throughput data determined for each access to and/or for each response received from storage units. For example, each storage unit can be mapped to a plurality of latency values and/or a plurality of throughput values with a corresponding plurality of time stamps in the historical latency data 920. The historical latency data 920 can be updated to store only latency data and/or throughput that compares favorably to a recency threshold and/or can store the most recent data up to a capacity of the corresponding memory is reached, where least recent data is removed to make room for new latency data and/or new throughput data.

The historical latency data 920 can include a latency summary calculated for each storage unit based on their respective latency values. The latency summary of a storage unit can be calculated by computing an average latency value of the storage unit by averaging all of the plurality of latency values of the storage unit. In some embodiments, only latency values that are more recent than a threshold timestamp, determined and updated in accordance with fixed, sliding window moving with the current time, are utilized to calculate the average latency value for the storage unit. Alternatively or in addition, the average latency value can be computed in accordance with a weighted average, where more recent latency values are weighted higher than less recent latency values. For example, an exponential, asymptotic, linear and/or non-linear function can be utilized to generate the weights for the latency values as a function of recency from the current time, for example, as a function of a difference between the current time and the timestamp of each latency value of the storage unit and/or ordering of the latency values for the storage unit by timestamp. The average latency value of the latency summary can be updated as time progresses, being recalculated automatically by the DST processing unit in predetermined time intervals by including newly acquired latency values, by utilizing only the most recent latency values in accordance with the sliding window, and/or by updating the weights of latency values for the weighted average in accordance with the change in respective recency of the latency values over time. The latency summary of a storage unit can further include normalizing the average latency value, for example, if the individual latency values were not already normalized, with respect to the average latency values across all storage units. For example, a normalizing function can be performed on all raw average latencies computed for all storage units to produce a corresponding set of normalized average latencies.

The latency summary of a storage unit can also include aggregate latency trends and/or statistics determined for individual storage units based on their latency trends over time. These can be computed by the DST processing unit based on the latency values. The aggregate trends and/or statistics can include latency trends indicating how often the storage unit is high and/or low latency, how rapidly the storage unit tends to shift between high and/or low latency, the range in which the storage unit's frequency tend to shift within a given time interval, scheduling such as time of day, week, and/or year that the storage units latency is affected, etc. For example, the latency summary of a storage unit can include variance and/or standard deviation of the latency values can further be computed, for example, across all latency values, across latency values within the sliding window, and/or in accordance with the respective weights generated for the latency values. This can be utilized to dictate the range of latency values that the latency of the storage unit is expected to fall within. The latency trends can be normalized across all storage units to dictate trends that are unique to particular storage units and opposed to trends dictated by factors that affect the entire system. These latency trends can be utilized by the DST processing unit to generate predicted latency values for some or all storage units. In some embodiments, predicted latency values for one or more storage units are utilized instead of or in addition to actual latency information determined for one or more storage units in probabilistically selecting storage units.

The historical latency data 920 can alternatively or additionally include a throughout summary calculated for each storage unit based on their respective throughput values, which can be calculated in the same or different fashion to include the same or different summary measures as discussed with regards to the latency summary data, instead utilizing the throughput values of the historical latency data 920. The historical latency data 920 can alternatively or additionally include a throughout summary calculated for each storage unit based on their respective throughput values, which can be calculated in the same or different fashion as discussed with regards to the latency summary data, instead utilizing the throughput values of the historical latency data 920.

When the DST processing unit must perform an access that will utilize a subset of possible storage units, a storage unit requirement step 931 can first be performed to determine a set of possible storage units that can be utilized. This can further include determining the number of storage units to be selected as the subset of storage units to perform the access and/or can include determining further requirements for selection of the subset of storage units from the set of possible storage units. This can be indicated in the access request, can be based on parameters or other characteristics of an IDA or other error coding scheme utilized to encode and decode data into encoded slices for storage. For example, the possible set of storage units can correspond to an IDA width number of storage units currently storing encoded data slices of a data segment indicated in a read request of the access request, and the number of storage units to be selected can correspond to the decode threshold parameter of the IDA utilized to encode the encoded data slices. As another example, the possible set of storage units can correspond to all storage units communicating with the DST processing unit when the access request indicates a write request for a new data segment, and the number of storage units to be selected can correspond to a IDA width parameter of the IDA that will be utilized to encode the data segment into a set of encoded data slices.

Once the set of possible storage units are identified, a summarization function 932 is performed to generate a set of latency summarization values, each indicating a summary measure of recent latencies and/or recent throughputs for the set of possible storage units. The latency summarization value for each storage unit can be determined, for example, by calculating the average latency value for each storage unit, where the summary measure corresponds to the average latency value. Performing the summarization function can include tracking a sliding window of latencies for the most recent requests to that each storage unit, from which a summary metric or multiple metrics can be calculated, such as the mean or a percentile for each storage unit and/or an aggregate mean or a percentile for all storage units. The summary function can alternately use all latencies for the storage units, for example, weighting more recent requests more heavily, such as with an exponentially weighted, moving average. The latency data of all storage units can be utilized, or only latency information of the already-selected set of possible storage units may be utilized. Latency summarization values for the possible set of storage units can be retrieved in the historical latency data 920, for example, by retrieving already-calculated normalized or un-normalized average latency value and/or latency trends for each of the possible set of storage units from the historical latency data 920. Alternatively, raw latency values can be retrieved from historical latency data 920 or other local cache, and can be utilized to generate the latency summarization values. A set of throughput summarization values can be generated in the same or different fashion as discussed with regards to the set of latency summarization values by instead utilizing raw or processed throughput values and/or throughput summary data.

These latency summarization values and/or throughput summarization value generated by performing the summarization function 932 can be the input to a weight generation function 933 to generate weights for the possible set of storage units in the probabilistic selection. Determining the weights can be in accordance with an inverse function, a strictly decreasing function, and/or monotonically decreasing function of relative latency, for example, where determining the weight of one storage unit is an inverse function, a strictly decreasing function, and/or monotonically decreasing function of its latency summarization value relative to the latency summarization values of all of the other ones of the set of possible storage units, and/or relative to the average latency summarization value across all of the other ones of the set of possible storage units. In particular, ones of the set of possible storage units with latency summarization values indicating low latency are assigned a higher weight than ones of the set of possible storage units with latency summarization values indicating higher latencies, where storage units with higher weights will correspond to a strictly higher probability of being selected in the subset of storage units than storage units with lower weights. Alternatively or in addition, ones of the set of possible storage units with throughput summarization values indicating high throughput are assigned a higher weight than ones of the set of possible storage units with throughput summarization values indicating lower throughputs. The weight can be a function of both latency and throughout, and can further be a function of the latency weighting factor and the throughput weighting factor discussed herein.

The weight generation function 933 can base the output selection weights on ratios, absolute differences, and/or other relative measures and/or other functions of the summary metrics of the latency summarization values. For example, when an overall low latency condition is met, a weighting function can base differences in selection probabilities on ratios of latencies, such as ratios of the average latency values of the possible set of storage units. The low latency condition can be determined to be met when most of and/or at least a threshold number of average latency values of the possible set of storage units are determined to be lower than an overall average latency value computed over time, and/or are determined to compare unfavorably to a low latency threshold value. The low latency condition can be determined to be met when an average latency value across all of the possible set of storage units is determined to be lower than the overall average latency value computed over time, and/or is determined to compare unfavorably to a low latency threshold value. Basing differences in selection probabilities on ratios of latencies in this case can be ideal because, due to recent average latencies of the storage units indicating lower-than-usual latencies, the absolute differences are small and would result in small differences in selection probability. Alternatively or in addition, output selection weights can be based on ratios, absolute differences, and/or other relative measures and/or other functions of summary metrics of the throughput summarization values when a low throughput condition is met, for example, based on throughput summarization values falling below and/or otherwise comparing unfavorably to a low throughput threshold value. This can similarly be utilized when absolute differences between throughput are small and would result in small differences in selection probability.

On the contrary, when an overall high latency condition is met, a weighting function can base differences the base differences in selection probabilities on absolute differences, such as absolute differences between the average latency values of the possible set of storage units and/or absolute differences from the average across the average latency values of the set of storage units. The high latency condition can be determined to be met when most of and/or at least a threshold number of average latency values of the possible set of storage units are determined to be higher than an overall average latency value computed over time and/or are determined to compare unfavorably to a high latency threshold value. The high latency condition can be determined to be met when an average latency value across all of the possible set of storage units is determined to be higher than the overall average latency value computed over time, and/or is determined to compare unfavorably to a high latency threshold value. Basing differences in selection probabilities on absolute differences of latencies in this case can be ideal because, due to recent average latencies of the storage units indicating higher-than-usual latencies, the ratios of latency values may be small even though there are large absolute differences. For example, storage units with 1100 ms and 1000 ms summary latency have only a 10% difference as a ratio, but the 100 ms absolute difference may be considered a difference that should cause the storage unit with 1000 ms latency to be selected most of the time. Alternatively or in addition, output selection weights can be based on absolute differences throughput summarization values when a high throughput condition is met, for example, based on throughput summarization values exceeding and/or otherwise comparing unfavorably to a high throughput threshold value. This can similarly be utilized when absolute differences large enough to result in more significant differences in selection probability.

To address these competing weighting schemes, a more complex weight generation function can be used, such as using a sigmoid function to shift between two sub-weight generation functions. For example, a fixed threshold condition dividing the high latency condition and the low latency condition, such as a determined latency threshold value, can be compared to the summary data to determine whether ratios or absolute differences are used. In particular, when the mean of the average latency values across all of the possible set of storage units is determined to be higher than the latency threshold value, the absolute differences between average latency values will be used for weight generation. When the mean of the average latency values across all of the possible set of storage units is determined to be lower than the latency threshold value, the ratios between average latency values will be used for weight generation. The latency threshold value can be intelligently selected by the DST processing unit and/or by a user interacting with a user interface via user input, for example, to best divide these two conditions such that differentiating probabilistic selection conditions of the storage units is optimized or otherwise favorable.

To enhance this process to be able to tune how the selection weighting function generates the weight differences between different latency values, before passing latencies to the weight generation function, and/or between the summarization of the latencies and their input to the selection probability function, they can be passed through transform function that can spread or gather latencies based on their magnitude. For example, a transform function that squares latencies can be utilized to will high latencies to spread further from each other, while causing low latencies will be spread less, and/or even be brought closer together.

Parameters of the selection weighting function, such as parameters dictating the transform function in particular, can further utilize parameters corresponding to a throughput weighting factor and/or a latency weighting factor in generating the weights. The selection weighting function can further assign the probability of selecting each storage unit based on such a throughput weighting factor and/or a latency weighting factor. As one example, the latency weighting factor and throughput weighting factor can indicate the selection of storage units is based 60% on latency and 40% on throughput. The difference and/or ratio between these factors can be utilized as an amount of selection bias that will be applied in selecting in favor of latency vs selection in favor of throughput, or vice versa.

For example, a higher ratio of throughput weighting factor to latency weighting factor can cause the selection weighting function to more heavily equalize the selection probabilities, based on the emphasized throughput weighting factor, to spread the load more evenly across storage units. A lower ratio of throughput weighting factor to latency weighting factor can cause the selection weighting function to less heavily equalize the selection probabilities, based on the emphasized latency weighting factor, to help ensure lower latency. The relative ordering of weight values generated by the weighting selection function can be independent of the throughput weighting factor and/or a latency weighting factor, where the relative ordering of weigh values assigned to the storage units will be the same for a given set of latency data and throughput data, given for any throughput weighting factor and/or a latency weighting factor. A higher ratio of throughput weighting factor to latency weighting factor can cause these weights to become closer together in value, to more closely equalize the selection probabilities, based on the higher ratio of throughput weighting factor to latency weighting factor indicating a preference for high throughput over low latency. A lower ratio of throughput weighting factor to latency weighting factor can cause these weights to become further apart in value, to cause the selection probabilities for lower latency to be further increased, for example, based on the lower ratio of throughput weighting factor to latency weighting factor indicating a preference for low throughput over high throughput. The absolute difference between any two weights can be a function, such as a monotonically increasing function, of the ratio of throughput weighting factor to latency weighting factor, where a higher ratio of throughput weighting factor to latency weighting factor causes the absolute differences to become smaller and where a lower ratio of throughput weighting factor to latency weighting factor causes the absolute differences to become larger. In particular, different transform functions can be performed to cause the weights to be spread more or less as a function of the ratio of throughput weighting factor to latency weighting factor.

Once the weights are generated, the DST processing unit can use a probabilistic selection function 934 utilizing the generated weights. This can include performing the selection as part of a random and/or pseudo-random process. For example, a weight can be generated for each of the storage units in the possible set of storage units in accordance with the weight generation scheme that utilizes raw, weighted, transformed, and/or normalized average latency values determined for each storage unit as discussed above. Once these weights are generated, the probability of selection of a storage unit in a single selection can be equal to or based on the ratio of its weight to the total sum of all of the weights. In some embodiments, subset weights are generated, where each subset weight is assigned to a corresponding one of the set of possible subsets that can be selected from the set of possible storage units, given the number of storage units that will be selected. For example, N choose R subset weights can be generated when R storage units will be selected from N possible storage units. As another example, N permutation R subset weights can be generated when a particular ordering, for example, corresponding to where each of a set of slices will be stored, will further be determined. Each subset weight can be generated based on the individual weights for the individual storage units in the particular unique combination of storage units in the corresponding one of the plurality of possible subsets. The subset weight for each possible subset can be based on the weights of the individual storage units included in the possible subset, and the probability of selection of a particular subset can be proportional to or based on the ratio of its subset weight divided by the total of the N choose R subset weights. For example, a random number can be generated in accordance with a uniform distribution within a fixed range, and each one of the N choose R possible subsets can be assigned one of a corresponding set of non-overlapping sub-ranges of the fixed range, where the size of the corresponding sub-range is directly proportional to the subset weight, and where the particular subset is selected when the randomly generated number falls within the corresponding sub-range.

In some embodiments, selecting storage units based upon these weights alone can result in a set of storage units that are rarely and/or never selected. For example, a storage unit with high measured latency can continually have correspondingly low weights indicating low probability of selection, and thus may be unselected for a very long time and/or for many iterations of this selection process. This can cause the storage units latency values to remain outdated, for example, where its most recent latency values utilized to generate weights are high, but also very old as a result of the storage unit not being selected for access requests, where more recent samplings of latency for these storage units are not received and utilized in future weight generation as a result.

To mitigate this problem, counters and/or watchdog timers can be utilized to ensure that all storage units are utilized for accesses and/or are sampled somewhat frequently, to ensure latency values for all storage units are generated somewhat frequently or otherwise remain relatively up to date. For example, a counter can be generated for all storage units, starting at a predetermined value generated automatically and/or selected via user input. The counter can periodically and/or aperiodically count down over time. Alternatively, the counter can start at zero and can similarly periodically and/or aperiodically count up until it reaches the predefined value. For example, the counter can decrease at fixed time intervals and/or can decrease in response to each selection that does not include the storage unit, where the storage unit was indicated in the possible set of storage units and/or otherwise was assigned a weight in accordance with a non-zero probability. Once the counter reaches zero, a latency measurement can be forced. This can include performing a sampling of the storage unit's latency by performing a latency test as discussed herein and updating the latency of the storage unit in response. This can alternatively or additionally include forcing that the storage unit be included in the next selection where the storage unit is indicated in the possible set of storage units, where the remainder of selected storage units are selected in accordance with their corresponding weights as normal. This can include redistributing the weights of the remaining storage units to account for the automatic selection of this storage unit.

Once the subset of storage units is selected, request generating step 935 can be performed to generate requests for transmission to the selected subset of storage units, in accordance with the original access request. This can include dispersed storage error encoding a data object indicated in the access request as a set of encoded slices for transmission to the selected subset of storage units. This can include generating a plurality of read requests for encoded slices stored in the selected subset of storage units, and decoding encoded slices received in response from the selected subset of storage units.

For example, as shown in FIG. 9, after a subset of storage units 1-R are selected, which can include storage unit 2 and storage unit N, but not storage unit 1, a set of requests 1-R are generated, for example, where request 1 is transmitted to storage unit 2 and request R is transmitted to storage unit N. The responses to the requests themselves or other internal latency information included in the responses from the subset of storage units 1-R can be received and/or determined latency data 1-R, and can be utilized to update the historical latency data 920 as discussed previously. While not shown, the responses 1-R can be processed by the DST processing unit to generate a single response for transmission to the requesting entity 960 that sent the original access request, for example, indicating a result of the access, indicating a success or failure of the access, and/or including at least one reproduced data segments retrieved and decoded in performing the access.

One or more DST processing systems of the DSN can allow operators or other users to change constants used in the selection weighting function, to emphasize either lower latency, for example, by favoring selection of the lowest latency storage units, or higher throughput, for example, by equalizing the selection probabilities to spread the load more evenly across storage units, depending on the relative importance of the two metrics. For example, users can adjust parameters dictating the behavior of the probabilistic selection by adjusting latency measurement parameters, adjusting sliding window length, adjust parameters dictating the n-th percentile utilized in generating average values, adjusting parameters of the weighting function, adjusting parameters of a sigmoid function or other selection function utilized to select between the two sub-weight generation functions, and/or adjusting parameters specific to each of the two sub-weight generation functions. As another example, the user can select the throughput weighting factor, latency weighting factor, and/or the respective ratio, via user input. The user can interact with a graphical user interface presented on a display device, for example, of user device 14 or another device of the DSN, to make these selections and/or change selections as desired via user input to the user device.

The graphical user interface can further display aggregate statistics, for example, generated from the historical latency data 420, illustrating the current state of latency of individual storage units and/or across the system, and/or illustrating trends of latency of individual storage units and/or across the system. In some embodiments, the graphical user interface can display changes to the latency across the system in time intervals dictated by changes to the parameters of the probabilistic selection. For example, first aggregate statistics can be generated for a first time interval where probabilistic selection utilized a first set of user-selected parameters, and second aggregate statistics can be generated for a second time interval where probabilistic selection utilized a second set of user-selected parameters, for example, in response to the user adjusting the parameters from the first set of user-selected parameters. The graphical user interface can present these separate sets of aggregate statistics to aid the user in determining which set of parameters work well and which parameters cause further latency problems, do not fix latency problems, cause storage units to switch between low and high latency too rapidly, cause too many storage units to remain un-selected for access by the DST processing unit, or cause other conditions. This can aid the user in making more intelligent user-selected parameters and better tune the system over time. In some embodiments, the DST processing unit performs its own analysis of aggregate statistics for different sets of parameters, and the DST processing unit can automatically tune some or all of the parameters itself over time based on determining to change parameters in response to determining current latency conditions are unfavorable and/or in response to an optimization process performed over time to continually fine tune the parameters of the probabilistic selection to optimize the latency conditions.

In various embodiments, a processing system of a dispersed storage and task (DST) processing unit includes at least one processor and a memory that stores operational instructions, that when executed by the at least one processor cause the processing system to receive an access request via a network. A set of possible storage units for performance of the access request are determined. A latency summarization value is determined for each of the set of possible storage units based on historical latency data for the set of possible storage units. A weight for each of the set of possible storage units is determined based on the latency summarization values to generate a plurality of weights. A probabilistic selection function is performed in accordance with the plurality of weights to select a proper subset of the set of possible storage units. A plurality of requests are generated based on the access request for transmission, via the network, to the proper subset of the set of possible storage units.

Figure 10:
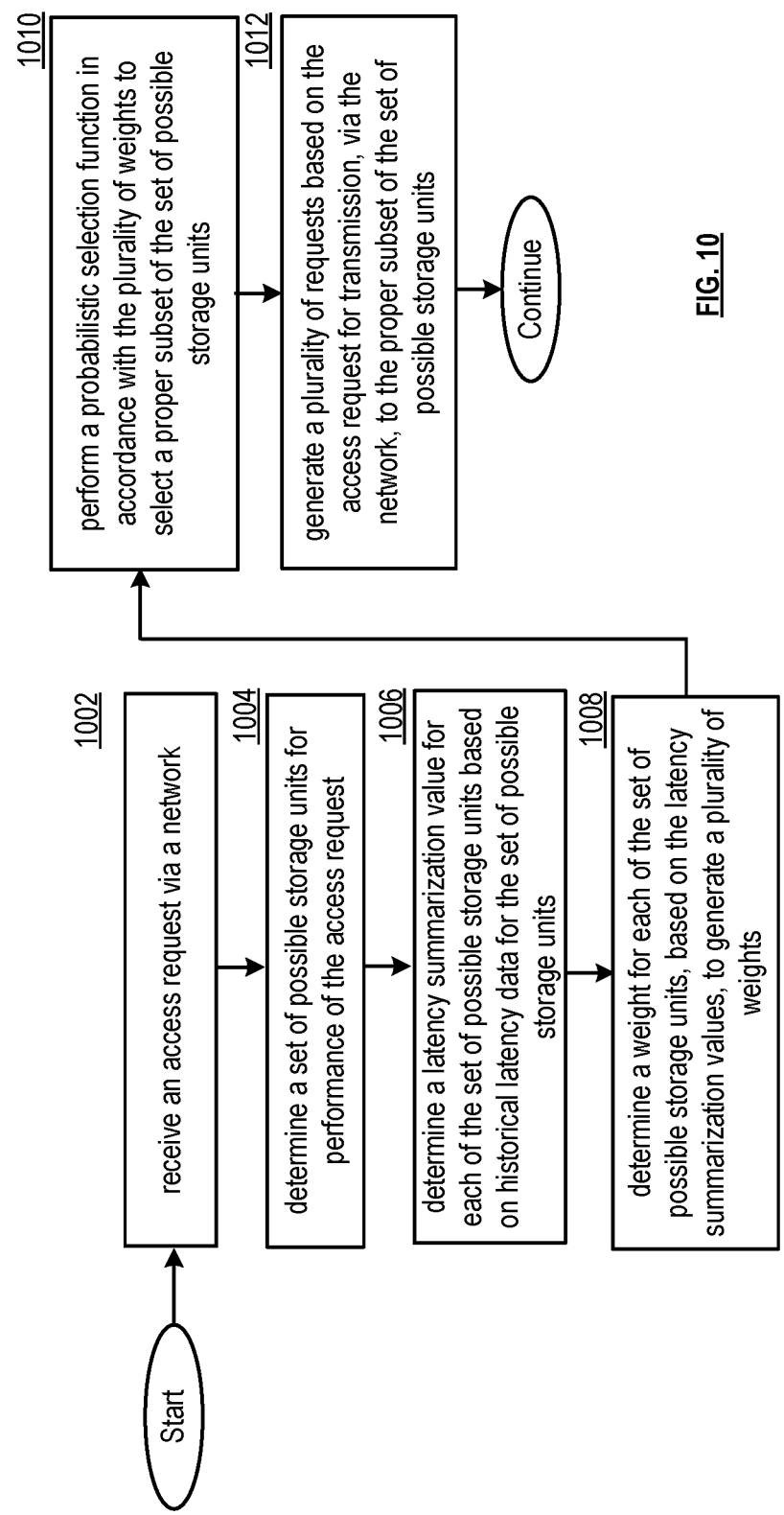
FIG. 10 is a logic diagram of an example of a method of probabilistically selecting storage units in accordance with the present invention.

FIG. 10 is a flowchart illustrating an example of probabilistically selecting storage units for completion of an access request. In particular, a method is presented for use in association with one or more functions and features described in conjunction with FIGS. 1-9, for execution by a dispersed storage and task (DST) processing unit that includes a processor or via another processing system of a dispersed storage network that includes at least one processor and memory that stores instruction that configure the processor or processors to perform the steps described below.

Step 1002 includes receiving an access request via a network. Step 1004 includes determining a set of possible storage units for performance of the access request. Step 1006 includes determining a latency summarization value for each of the set of possible storage units based on historical latency data for the set of possible storage units. Step 1008 includes determining a weight for each of the set of possible storage units, based on the latency summarization values, to generate a plurality of weights. Step 1010 includes performing a probabilistic selection function in accordance with the plurality of weights to select a proper subset of the set of possible storage units. Step 1012 includes generating a plurality of requests based on the access request for transmission, via a network, to the proper subset of the set of possible storage units. In various embodiments, the method further includes updating the historical latency data based on a plurality of responses received, via the network, from the proper subset of the set of possible storage units in response to the plurality of requests.

In various embodiments, the method further includes determining a desired number of storage units for selection based on the access request, where the proper subset of the set of possible storage units includes exactly the desired number of storage units. In various embodiments, the access request includes a write request to store a data segment, and the desired number of storage units for selection corresponds to an information dispersal algorithm (IDA) width number. Generating the plurality of requests includes generating the IDA width number of encoded data slices of the data segment by performing a dispersed storage error encoding function on the data segment that utilizes an IDA width parameter that corresponds to the IDA width number. Each of plurality of requests include a write request that includes one of the IDA width number of encoded data slices for transmission to a corresponding one of the proper subset of the set of possible storage units. In various embodiments, a data segment was dispersed storage error encoded in accordance with an IDA width parameter and an IDA decode threshold parameter to generate an IDA width number of encoded data slices stored in an IDA width number of storage units. The access request includes a read request to read the data segment, and determining the set of possible storage units includes selecting the IDA width number of storage units storing the encoded data slices of the data segment. The desired number of storage units for selection corresponds to the IDA decode threshold parameter. Generating the plurality of requests includes generating a set of read requests for transmission to the proper subset of the set of possible storage units. The method further includes receiving, via the network, an IDA decode threshold number of the encoded data slices in a set of responses from the proper subset of the set of possible storage units, and reproducing the data segment by performing a dispersed error storage decoding function on the IDA decode threshold number of the encoded data slices.

In various embodiments, determining each latency summarization values for each of the set of possible storage units includes determining an average latency value for each of the set of possible storage units based on a plurality of latency values of the each of the set of possible storage units that compares favorably to a recency threshold. In various embodiments, determining each latency summarization values for each of the set of possible storage units includes determining a mean latency value of only the plurality of latency values of the each of the set of possible storage units that fall within and/or otherwise compare favorably to a predefined range and/or percentile of the plurality of latency values. These can latency values utilized to generate a mean latency value within a predefined percentile can also be determined to compare favorably to the recency threshold, where latency values that compare unfavorably to the recency threshold are not utilized in computing this mean latency value.

In various embodiments, the historical latency data includes a plurality of latency values for each of the set of possible storage units, where determining each latency summarization values for each of the set of possible storage units includes determining a weighted average latency value for each of the set of possible storage units based on weighting each of a plurality of latency values of the each of the set of possible storage units as a function of recency of the each of the plurality of latency values. More recent ones of the plurality of latency values can be more heavily weighted than less recent ones of the plurality of latency values in computing the weighted average latency value. In various embodiments, determining each latency summarization values for each of the set of possible storage units includes normalizing the latency summarization values across the set of possible storage units.

In various embodiments, determining the weight for each of the set of possible storage units is an inverse function, such as a strictly decreasing function and/or a monotonically decreasing function, of latency relative to the other ones of the set of possible storage units. In particular, ones of the set of possible storage units with latency summarization values indicating low latency are assigned a higher weight than ones of the set of possible storage units with latency summarization values indicating higher latencies. In various embodiments, determining the weight for each of the set of possible storage units is a function of a ratio between the latency summarization value of the each of the set of possible storage units and latency summarization values of other ones of the set of possible storage units. In various embodiments, determining the weight for each of the set of possible storage units is a function of an absolute between the latency summarization value of the each of the set of possible storage units and latency summarization values of other ones of the set of possible storage units.

In various embodiments, determining the weight for each of the set of possible storage units includes performing a selection function to select one of a set of possible weight generator functions; and performing the one of the set of possible weight generator functions on the latency summarization values to generate the plurality of weights. In various embodiments, performing the selection function includes performing a sigmoid function by comparing a computed average of latency summarization values of the set of possible storage units to a latency threshold value of the sigmoid function to select the one of the set of possible weight generator functions. In various embodiments, performing the selection function otherwise includes comparing a computed average of latency summarization values of the set of possible storage units to one or more latency threshold values of the selection function to select the one of the set of possible weight generator functions. In various embodiments, the set of possible weight generator functions includes a first weight generator function and a second weight generator function. The first weight generator function generates each of the plurality of weights as a function of a ratio between the latency summarization value of the each of the set of possible storage units and latency summarization values of other ones of the set of possible storage units. The second weight generator function generates each of the plurality of weights as a function of an absolute between the latency summarization value of the each of the set of possible storage units and latency summarization values of other ones of the set of possible storage units. The first weight generator function is selected when the computed average of latency summarization values indicates a lower latency than the latency threshold value, and the second weight generator function is selected when the computed average of latency summarization values indicates a higher latency than the latency threshold value.

In various embodiments, a first probability that a first one of the possible set of storage units will be selected in the proper subset of the possible set of storage units is greater than a second probability that a second one of the possible set of storage units will be selected in the proper subset of the possible set of storage units in response to a first one of the plurality of weights for the first one of the possible set of storage units being greater than a second one of the plurality of weights for the second one of the possible set of storage units. In various embodiments, the first one of the plurality of weights is greater than the second one of the plurality of weights in response to the latency summarization value for the first one of the possible set of storage units indicating a lower latency than the latency summarization value for the second one of the possible set of storage units.

In various embodiments, a non-transitory computer readable storage medium includes at least one memory section that stores operational instructions that, when executed by a processing system of a dispersed storage network (DSN)

that includes a processor and a memory, causes the processing system to receive an access request via a network. A set of possible storage units for performance of the access request are determined. A latency summarization value is determined for each of the set of possible storage units based on historical latency data for the set of possible storage units. A weight for each of the set of possible storage units is determined based on the latency summarization values to generate a plurality of weights. A probabilistic selection function is performed in accordance with the plurality of weights to select a proper subset of the set of possible storage units. A plurality of requests are generated based on the access request for transmission, via the network, to the proper subset of the set of possible storage units.

Figure 11:
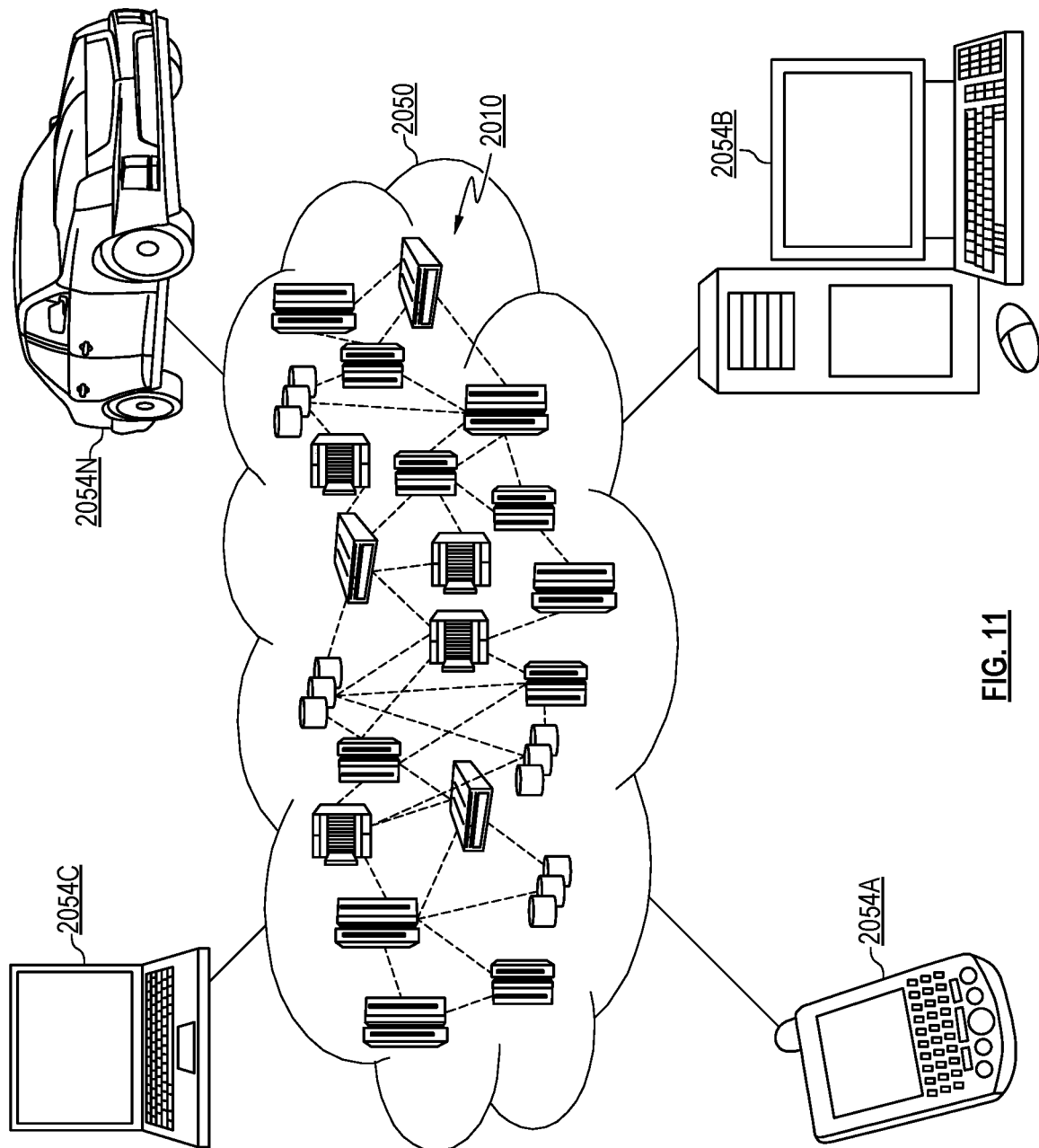
FIG. 11 depicts a cloud computing environment according to an embodiment of the present invention.

FIG. 11 presents an illustrative cloud computing environment 2050. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 11 are intended to be illustrative only and that computing nodes 2010 and cloud computing environment 2050 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

In various embodiments, the DSN can be implemented by utilizing the cloud computing environment 2050 and/or can communicate with cloud computing environment 2050. Alternatively or in addition, the plurality of computing devices 12-16 of FIG. 1, the managing unit of FIG. 1, and/or the integrity processing unit 20 of FIG. 1, and/or storage units 36 can be implemented by utilizing cloud computing nodes 2010, personal digital assistant (PDA) or cellular telephone 2054A, desktop computer 2054B, laptop computer 2054C, and/or automobile computer system 2054N. In various embodiments, the cloud computing nodes 2010, personal digital assistant (PDA) or cellular telephone 2054A, desktop computer 2054B, laptop computer 2054C, and/or automobile computer system 2054N can communicate by utilizing network 24 of FIG. 1.

Figure 12:
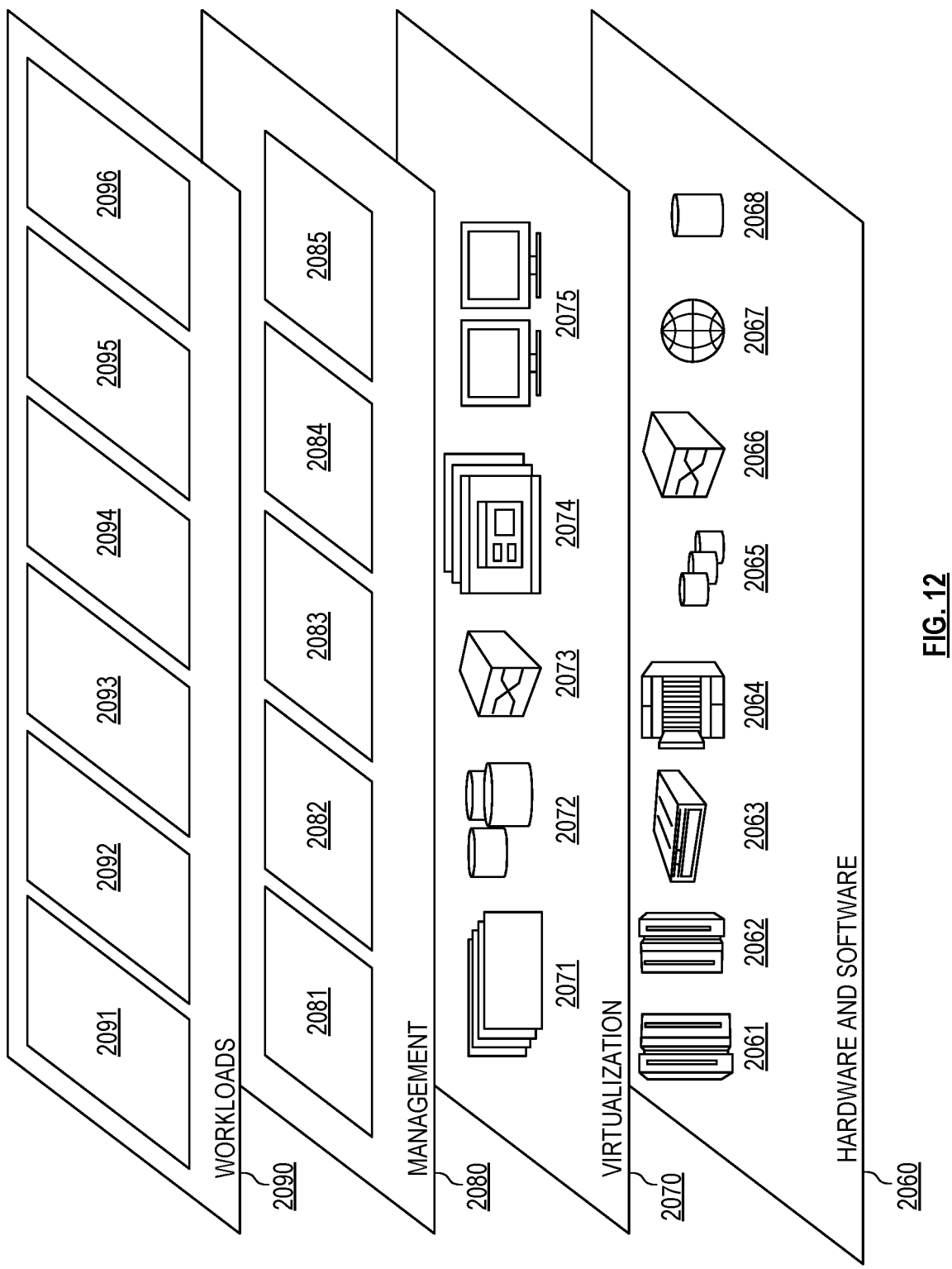
FIG. 12 depicts abstraction model layers according to an embodiment of the present invention.

Referring now to FIG. 12, a set of functional abstraction layers provided by cloud computing environment 2050 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068. In some embodiments, one or more hardware components can be implemented by utilizing the computing device 2300 of FIG. 13.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and probabilistic selection system 2096. In some embodiments, the DSN 10 can utilize utilizing the cloud computing environment 2050, for example, by utilizing the probabilistic selection system 2096 of the workloads layer 2090 of FIG. 12 to perform probabilistic selection of storage units for performing an access request in the DSN, based on latency and/or throughput, as described in conjunction with FIGS. 1-10, where some or all computing devices 12-16 of FIG. 1 and/or where one or more DST processing units 910 of FIG. 9 communicate with the network via a corresponding node 2010 of the cloud computing environment 2050.

Figure 13:
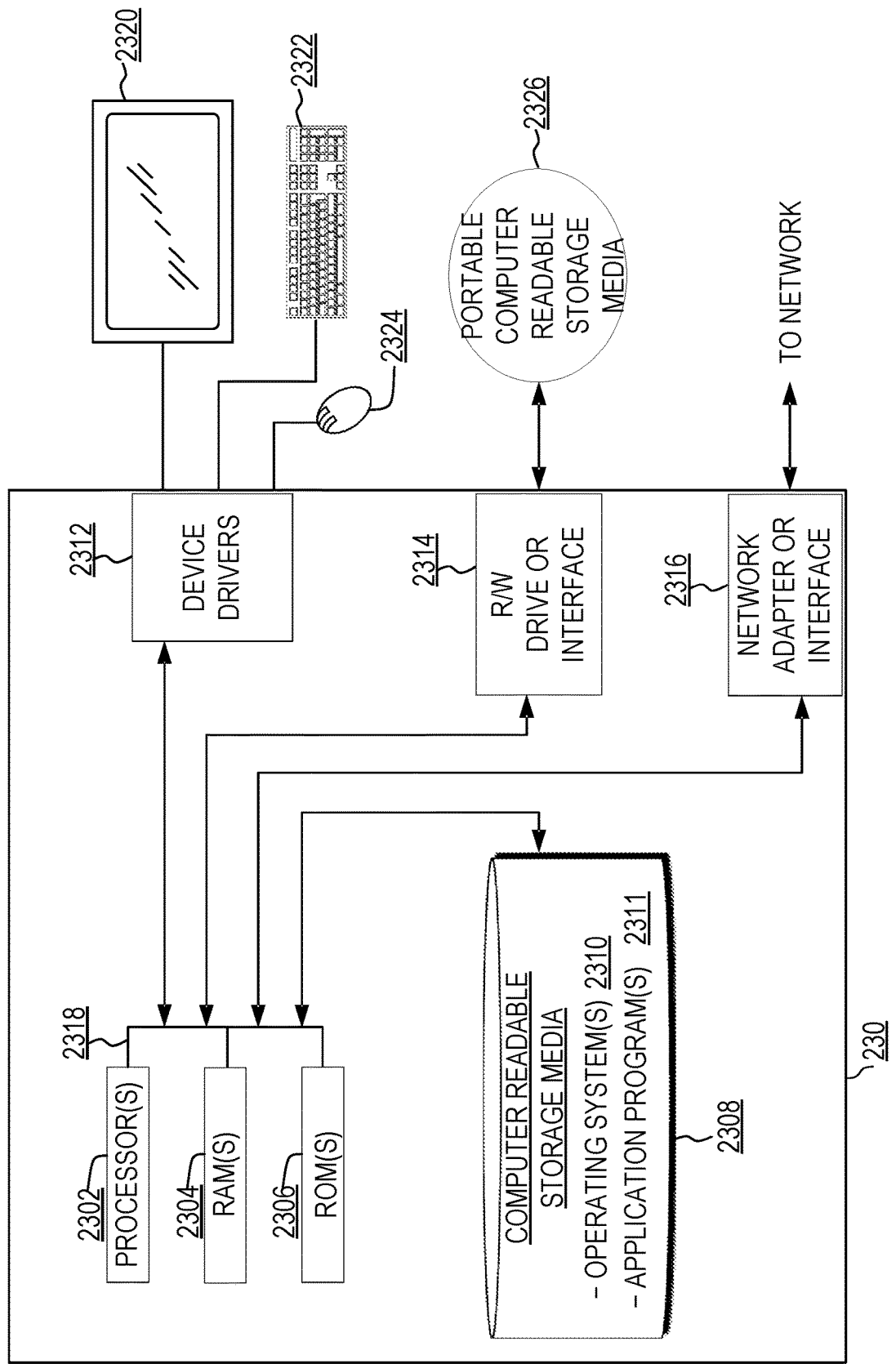
FIG. 13 depicts a block diagram of a computing device according to various embodiments of the present invention.

FIG. 13 depicts a block diagram of components of a computing device 2300, which can be utilized to implement some or all of the cloud computing nodes 2010, some or all of the computing devices 54A-N of FIG. 11, and/or to implement other computing devices described herein in accordance with an embodiment of the present invention. The computing device 2300 can be utilized to implement some or all of the plurality of computing devices 12-16 of FIG. 1, the DS client module 34 of FIG. 1, the managing unit of FIG. 1, the integrity processing unit 20 of FIG. 1, and/or storage units 36 of FIG. 1. For example the computing core 26 of FIG. 2 can be implemented by utilizing the computing device 2300. It should be appreciated that FIG. 13 provides only an illustration of one implementation and does not imply any limitations with regard to the environments in which different embodiments may be implemented. Many modifications to the depicted environment may be made.

Computing device 2300 can include one or more processors 2302, one or more computer-readable RAMs 2304, one or more computer-readable ROMs 2306, one or more computer readable storage media 2308, device drivers 2312, read/write drive or interface 2314, and network adapter or interface 2316, all interconnected over a communications fabric 2318. Communications fabric 2318 can be implemented with any architecture designed for passing data and/or control information between processors (such as microprocessors, communications and network processors, etc.), system memory, peripheral devices, and any other hardware components within the system.

One or more operating systems 2310 and/or application programs 2311, such as network application server software 2067 and database software 2068, are stored on one or more of the computer readable storage media 2308 for execution by one or more of the processors 2302 via one or more of the respective RAMs 2304 (which typically include cache memory). In the illustrated embodiment, each of the computer readable storage media 2308 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 2300 can also include a R/W drive or interface 2314 to read from and write to one or more portable computer readable storage media 2326. Application programs 2311 on computing devices 2300 can be stored on one or more of the portable computer readable storage media 2326, read via the respective R/W drive or interface 2314 and loaded into the respective computer readable storage media 2308.

Computing device 2300 can also include a network adapter or interface 2316, such as a TCP/IP adapter card or wireless communication adapter. Application programs 2311 on computing devices 2054A-N can be downloaded to the computing device from an external computer or external storage device via a network (for example, the Internet, a local area network or other wide area networks or wireless networks) and network adapter or interface 2316. From the network adapter or interface 2316, the programs may be loaded into the computer readable storage media 2308. The network may comprise copper wires, optical fibers, wireless transmission, routers, firewalls, switches, gateway computers and edge servers.

Computing device 2300 can also include a display screen 2320, a keyboard or keypad 2322, and a computer mouse or touchpad 2324. Device drivers 2312 interface to display screen 2320 for imaging, to keyboard or keypad 2322, to computer mouse or touchpad 2324, and/or to display screen 2320 for pressure sensing of alphanumeric character entry and user selections. The device drivers 2312, R/W drive or interface 2314, and network adapter or interface 2316 can comprise hardware and software stored in computer readable storage media 2308 and/or ROM 2306.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%).

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing system", "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing system, and/or processing unit may be, or further include, memory and/or an integrated memory element, which may be a single memory device, a plurality of memory devices, and/or embedded circuitry of another processing module, module, processing circuit, processing system, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing system, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing system, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing system, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a dispersed storage and task (DST) processing unit that includes a processor, the method comprises:
    receiving an access request via a network;
    determining a set of possible storage units, from a plurality of storage units in a dispersed storage network (DSN), for performance of the access request;
    determining a latency value for each of the set of possible storage units;
    determining a weight for each of the set of possible storage units, based on the latency values, to generate a plurality of weights;
    selecting a proper subset of the set of possible storage units based on a probabilistic selection function of the plurality of weights; and
    generating a plurality of requests based on the access request for transmission, via the network, to the proper subset of the set of possible storage units.

2. The method of claim 1, further comprising updating the historical latency data based on a plurality of responses received, via the network, from the proper subset of the set of possible storage units in response to the plurality of requests.

3. The method of claim 1, further comprising determining a desired number of storage units for selection based on the access request, wherein the proper subset of the set of possible storage units includes exactly the desired number of storage units.

4. The method of claim 3, wherein the access request includes a write request to store a data segment, wherein the desired number of storage units for selection corresponds to an information dispersal algorithm (IDA) width number, and wherein generating the plurality of requests includes:
    generating the IDA width number of encoded data slices of the data segment by performing a dispersed storage error encoding function on the data segment that utilizes an IDA width parameter that corresponds to the IDA width number, wherein each of plurality of requests include a write request that includes one of the IDA width number of encoded data slices for transmission to a corresponding one of the proper subset of the set of possible storage units.

5. The method of claim 3, wherein a data segment was dispersed storage error encoded in accordance with an information dispersal algorithm (IDA) width parameter and an IDA decode threshold parameter to generate an IDA width number of encoded data slices stored in an IDA width number of storage units, wherein the access request includes a read request to read the data segment, wherein determining the set of possible storage units includes selecting the IDA width number of storage units storing the encoded data slices of the data segment, wherein the desired number of storage units for selection corresponds to the IDA decode threshold parameter, wherein generating the plurality of requests includes generating a set of read requests for transmission to the proper subset of the set of possible storage units, further comprising:
receiving, via the network, an IDA decode threshold number of the encoded data slices in a set of responses from the proper subset of the set of possible storage units; and
reproducing the data segment by performing a dispersed error storage decoding function on the IDA decode threshold number of the encoded data slices.

6. The method of claim 1, wherein determining each latency values for each of the set of possible storage units includes one of: determining an average latency value for each of the set of possible storage units based on all of a plurality of latency values of the each of the set of possible storage units that compares favorably to a recency threshold, or determining a mean latency value for each of the set of possible storage units utilizing only ones of the plurality of latency values of the each of the set of possible storage units that compare favorably to the recency threshold and that also compare favorably to a predefined percentile of the plurality of latency values.

7. The method of claim 1, wherein the latency value for each of the set of possible storage units is based on historical latency data including a plurality of latency values for each of the set of possible storage units, wherein determining each latency values for each of the set of possible storage units includes determining a weighted average latency value for each of the set of possible storage units based on weighting each of a plurality of latency values of the each of the set of possible storage units as a function of recency of the each of the plurality of latency values, wherein more recent ones of the plurality of latency values that are more heavily weighted than less recent ones of the plurality of latency values.

8. The method of claim 1, wherein determining each latency values for each of the set of possible storage units includes normalizing the latency values across the set of possible storage units.

9. The method of claim 1, wherein determining the weight for each of the set of possible storage units is a monotonically decreasing function of relative latency to the other ones of the set of possible storage units, and wherein ones of the set of possible storage units with latency values indicating latencies that are lower than other ones of the set of possible storage units are assigned higher weights than the other ones of the set of possible storage units.

10. The method of claim 1, wherein determining the weight for each of the set of possible storage units is a function of a ratio between the latency value of the each of the set of possible storage units and latency values of other ones of the set of possible storage units.

11. The method of claim 1, wherein determining the weight for each of the set of possible storage units is a function of an absolute between the latency value of the each of the set of possible storage units and latency values of other ones of the set of possible storage units.

12. The method of claim 1, wherein determining the weight for each of the set of possible storage units includes:
performing a selection function to select one of a set of possible weight generator functions; and performing the one of the set of possible weight generator functions on the latency values to generate the plurality of weights.

13. The method of claim 12, wherein the selection function includes comparing a computed average of latency values of the set of possible storage units to a latency threshold value to select the one of the set of possible weight generator functions.

14. The method of claim 13, the set of possible weight generator functions includes a first weight generator function and a second weight generator function, wherein the first weight generator function generates each of the plurality of weights as a function of a ratio between the latency value of the each of the set of possible storage units and latency values of other ones of the set of possible storage units, wherein the second weight generator function generates each of the plurality of weights as a function of an absolute between the latency value of the each of the set of possible storage units and latency values of other ones of the set of possible storage units, wherein the first weight generator function is selected when the computed average of latency values indicates a lower latency than the latency threshold value, and wherein the second weight generator function is selected when the computed average of latency values indicates a higher latency than the latency threshold value.

15. The method of claim 1, wherein a first probability that a first one of the possible set of storage units will be selected in the proper subset of the possible set of storage units is greater than a second probability that a second one of the possible set of storage units will be selected in the proper subset of the possible set of storage units in response to a first one of the plurality of weights for the first one of the possible set of storage units being greater than a second one of the plurality of weights for the second one of the possible set of storage units.

16. The method of claim 15, wherein the first one of the plurality of weights is greater than the second one of the plurality of weights in response to the latency value for the first one of the possible set of storage units indicating a lower latency than the latency value for the second one of the possible set of storage units.

17. A processing system of a dispersed storage and task (DST) processing unit comprises:
at least one processor;
a memory that stores operational instructions, that when executed by the at least one processor cause the processing system to:
receive an access request via a network;
determine a set of possible storage units, from a plurality of storage units in a dispersed storage network (DSN), for performance of the access request;
determine a latency value for each of the set of possible storage units;

determine a weight for each of the set of possible storage units, based on the latency values, to generate a plurality of weights;

select a proper subset of the set of possible storage units based on a probabilistic selection function of the plurality of weights; and generate a plurality of requests based on the access request for transmission, via the network, to the proper subset of the set of possible storage units.

18. The processing system of claim 17, wherein determining each latency values for each of the set of possible storage units includes determining a mean latency value for each of the set of possible storage units utilizing only ones of the plurality of latency values of the each of the set of possible storage units that compare favorably to a recency threshold, and that also compare favorably to a predefined percentile of the plurality of latency values.

19. The processing system of claim 17, wherein the latency value for each of the set of possible storage units is based on historical latency data including a plurality of latency values for each of the set of possible storage units, wherein determining each latency values for each of the set of possible storage units includes determining a weighted average latency value for each of the set of possible storage units based on weighting each of a plurality of latency values of the each of the set of possible storage units as a function of recency of the each of the plurality of latency values, wherein more recent ones of the plurality of latency values that are more heavily weighted than less recent ones of the plurality of latency values.

20. A non-transitory computer readable storage medium comprises:

at least one memory section that stores operational instructions that, when executed by a processing system of a dispersed storage network (DSN) that includes a processor and a memory, causes the processing system to:

receive an access request via a network;

determine a set of possible storage units, from a plurality of storage units included in the DSN, for performance of the access request;

determine a latency value for each of the set of possible storage units;

determine a weight for each of the set of possible storage units, based on the latency values, to generate a plurality of weights;

select a proper subset of the set of possible storage units based on a probabilistic selection function of the plurality of weights; and generate a plurality of requests based on the access request for transmission, via the network, to the proper subset of the set of possible storage units.

* * * * *